United States Patent
Boissinot et al.

(10) Patent No.: US 9,043,102 B2
(45) Date of Patent: May 26, 2015

(54) BRAKE ASSIST FUNCTION

(75) Inventors: Frederic J. Boissinot, Ann Arbor, MI (US); Yi Zhu, Bloomfield Hills, MI (US); Zachary C. Rogalski, Rochester Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 659 days.

(21) Appl. No.: 12/912,047

(22) Filed: Oct. 26, 2010

(65) Prior Publication Data

US 2012/0101699 A1 Apr. 26, 2012

(51) Int. Cl.
| | | |
|---|---|---|
| G06F 19/00 | (2011.01) |
| B60W 10/188 | (2012.01) |
| B60W 10/06 | (2006.01) |
| B60W 10/11 | (2012.01) |
| B60W 30/18 | (2012.01) |

(52) U.S. Cl.
CPC ............ *B60W 10/188* (2013.01); *Y10T 477/647* (2015.01); *B60W 10/06* (2013.01); *B60W 10/11* (2013.01); *B60W 30/18136* (2013.01); *B60W 2510/0666* (2013.01); *B60W 2510/0676* (2013.01); *B60W 2510/1005* (2013.01); *B60W 2510/1085* (2013.01); *B60W 2510/182* (2013.01); *B60W 2510/184* (2013.01); *B60W 2520/105* (2013.01); *B60W 2710/1005* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,231,897 A | * | 8/1993 | Morita | 477/120 |
| 5,577,580 A | * | 11/1996 | Polzin et al. | 192/220 |
| 5,643,135 A | * | 7/1997 | Tabata et al. | 477/154 |
| 5,873,802 A | * | 2/1999 | Tabata et al. | 477/96 |
| 5,921,889 A | * | 7/1999 | Nozaki et al. | 477/158 |
| 6,059,688 A | * | 5/2000 | Nozaki et al. | 477/97 |
| 6,067,495 A | * | 5/2000 | Fliearman et al. | 701/55 |
| 6,152,853 A | * | 11/2000 | Banks, III | 477/186 |
| 6,835,164 B2 | * | 12/2004 | Habeck | 477/132 |
| 6,934,618 B2 | * | 8/2005 | Eckert et al. | 701/70 |
| 7,014,592 B2 | * | 3/2006 | Wiethe et al. | 477/120 |
| 7,460,941 B2 | * | 12/2008 | Sychra et al. | 701/50 |
| 7,822,525 B2 | * | 10/2010 | Tanimichi et al. | 701/74 |
| 2001/0016795 A1 | * | 8/2001 | Bellinger | 701/53 |
| 2004/0009843 A1 | * | 1/2004 | Habeck | 477/143 |
| 2004/0015283 A1 | * | 1/2004 | Eckert et al. | 701/70 |
| 2004/0215385 A1 | * | 10/2004 | Aizawa et al. | 701/93 |
| 2005/0101437 A1 | * | 5/2005 | Wiethe et al. | 477/120 |
| 2010/0280729 A1 | * | 11/2010 | Samsioe et al. | 701/93 |
| 2012/0094803 A1 | * | 4/2012 | Hyodo et al. | 477/173 |

* cited by examiner

*Primary Examiner* — Jonathan L Sample
(74) *Attorney, Agent, or Firm* — Ralph E Smith

(57) ABSTRACT

A method of controlling a vehicle having a transmission system, an engine system, and a braking system includes detecting a braking condition of the braking system. The braking condition is at least one of a brake temperature being above a predetermined brake temperature limit and a braking load being above a predetermined braking load limit. The method also includes detecting a second condition of at least one of the transmission system and the engine system. The method also includes determining whether the second condition satisfies predetermined criteria. Furthermore, the method includes detecting an absolute vehicle acceleration that is below a predetermined acceleration limit. Moreover, the method includes downshifting from a current gear to a lower gear to thereby cause engine braking when the braking condition is satisfied, the second condition satisfies the predetermined criteria, and the absolute vehicle acceleration is below the predetermined acceleration limit.

18 Claims, 3 Drawing Sheets

BRAKE ASSIST FUNCTION

FIELD

The following relates to vehicle braking and, more particularly, relates to a brake assist function for assisting in braking a vehicle, for instance, when traveling downhill.

BACKGROUND

Vehicles often include a braking system for selectively applying a braking load to one or more wheels. These braking systems can include brake calipers, drum brakes, rotors, hydraulic components, and the like. By depressing a brake pedal, the driver can selectively activate these braking components to decelerate the vehicle.

Furthermore, vehicles can be decelerated via engine braking. For instance, the driver can manually downshift gears in the vehicle transmission system, thereby generating a braking load within the engine that decelerates the vehicle. Accordingly, engine braking can assist the braking system and reduce the load on the braking system, for instance, when traveling down a steep grade.

SUMMARY

A method of controlling a vehicle having a transmission system, an engine system, and a braking system includes detecting a braking condition of the braking system. The braking condition is at least one of a brake temperature being above a predetermined brake temperature limit and a braking load being above a predetermined braking load limit. The method also includes detecting a second condition of at least one of the transmission system and the engine system. The method also includes determining whether the second condition satisfies a predetermined criteria. Furthermore, the method includes detecting an absolute vehicle acceleration that is below a predetermined acceleration limit. Moreover, the method includes downshifting from a current gear to a lower gear to thereby cause engine braking when the braking condition is satisfied, the second condition satisfies the predetermined criteria, and the absolute vehicle acceleration is below the predetermined acceleration limit.

A vehicle is also disclosed. The vehicle includes an engine system that outputs power and a transmission system that transfers power from the engine system to be delivered to the wheel. The transmission system includes a plurality of gears. Furthermore, the vehicle includes a braking system that selectively decelerates the wheel. The braking system is operable to detect a braking condition of the braking system. The braking condition is at least one of a brake temperature being above a predetermined brake temperature limit and a braking load being above a predetermined braking load limit. Furthermore, the vehicle includes at least one control system that causes selective downshifting among the plurality of gears to thereby cause engine braking when the braking condition is satisfied, when an absolute vehicle acceleration is below a predetermined acceleration limit, and also when a second condition is satisfied. The second condition is a condition of at least one of the engine system and the transmission system.

BRIEF DESCRIPTION OF THE DRAWINGS

The present invention will become more fully understood from the detailed description and the accompanying drawings, wherein.

DETAILED DESCRIPTION

Figure 1:
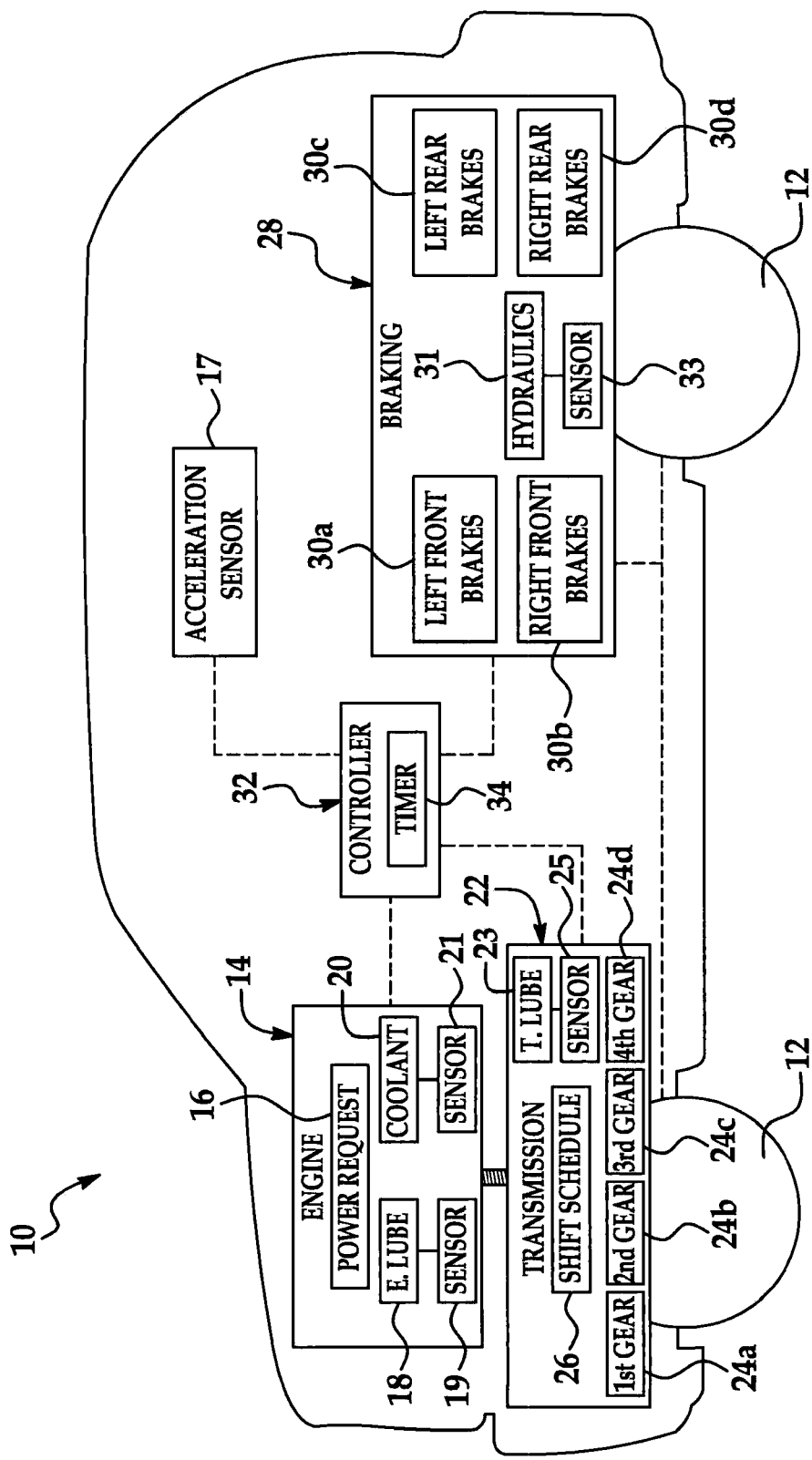
FIG. 1 is a schematic illustration of a vehicle according to various exemplary embodiments of the present disclosure.

Referring initially to FIG. 1, a vehicle 10 is schematically illustrated according to various exemplary embodiments of the present disclosure. Although a car is illustrated, it will be appreciated that the vehicle 10 can be of any suitable type (e.g., a truck, a motorcycle, etc.) without departing from the scope of the present disclosure.

As shown, the vehicle 10 can include one or more wheels 12. The vehicle 10 can include any number of wheels 12 without departing from the scope of the present disclosure.

Moreover, the vehicle 10 can include an engine system 14. The engine system 14 can be of any suitable type, such as a known internal combustion (IC) engine that converts the combustion of fuel into rotational power of an output shaft. In other embodiments, the engine system 14 can include an electric motor, an IC/electric electric hybrid engine, a fuel cell, or any other system for outputting power and torque and for propelling the vehicle 10.

As shown, the engine system 14 can include various components, including a power request device 16. The power request device 16 can include a throttle pedal, a rotatable hand-grip, or other type of user-manipulated device that the user can use to communicate with the engine system 14 and to selectively increase power output from the engine system 14. Specifically, the power request device 16 can be a throttle pedal that can be actuated by the user's foot in order to selectively change the power output by the engine system 14. Accordingly, the power request device 16 can be used to selectively request increased power output, and in some situations, the speed of the vehicle 10 can be increased as a result.

Moreover, the engine system 14 can include a lubricant 18. The lubricant 18 can be of any suitable type, such as oil, synthetic oil, or other lubricant. It will be appreciated that the lubricant 18 can lubricate various moving parts of the engine system 14. Moreover, the engine system 14 can include a lubricant sensor 19 for detecting a characteristic of the lubricant 18. The sensor 19 can be of any suitable type, such as a thermometer, for directly detecting the temperature of the lubricant 18. Also, in some embodiments, the sensor 19 can detect the temperature of the lubricant 18 indirectly, for instance, according to predetermined models of the lubricant temperature that are dependent upon vehicle speed, travel time, etc. In another embodiment, the sensor 19 can be a pressure sensor for directly or indirectly detecting the pressure of the lubricant 18. In still another embodiment, the sensor 19 can detect a remaining life of the lubricant 18.

Additionally, the engine system 14 can include a coolant 20. The coolant 20 can be of any suitable type, and in some embodiments the coolant 20 can flow through the engine system 14 to distribute heat and maintain the engine system 14 within a predetermined operating temperature. Moreover, in some embodiments, the engine system 14 can include a coolant sensor 21 that detects a characteristic of the coolant 20. The sensor 21 can be of any suitable type, such as a thermometer for detecting the temperature of the coolant 20. Also, in some embodiments, the sensor 21 can detect the temperature of the coolant 20 indirectly, for instance, according to predetermined models of the coolant temperature that are dependent upon vehicle speed, travel time, etc. In still another embodiment, the sensor 21 can detect a remaining life of the coolant 20.

Moreover, the engine system 14 can include an acceleration sensor 17 that detects the acceleration of the vehicle 10. The sensor 17 can be of any suitable type. For instance, the sensor 17 can communicate with a speedometer to detect a change in speed of the vehicle 10.

Moreover, the vehicle 10 can include a transmission system 22. Generally, the transmission system 22 is operable to transfer power output from the engine system 14 to be delivered to the wheels 12 (e.g., via a plurality of powertrain components (not shown)). The transmission system 22 can include a plurality of gears 24a-24d. The transmission system 22 can include any number of gears 24a-24d. In some embodiments, the transmission system 22 can include a first gear 24a, a second gear 24b, a third gear 24c, and a fourth gear 24d, each with different gear ratios. For purposes of discussion, it will be assumed that the fourth gear 24d is the highest gear, the third gear 24c is the next highest gear, the second gear 24b is the next highest gear, and the first gear 24a can be considered the lowest available gear.

Also, the transmission system 22 can include a lubricant 23. The lubricant 23 can be of any suitable type, such as oil, synthetic oil, or other transmission lubricant. It will be appreciated that the lubricant 23 can lubricate various moving parts of the transmission system 22. Moreover, the transmission system 22 can include a lubricant sensor 25 for detecting a characteristic of the lubricant 23. The sensor 25 can be of any suitable type, such as a pressure sensor for detecting the pressure of the lubricant 23. Also, in some embodiments, the sensor 25 can detect the pressure of the lubricant 23 indirectly, for instance, according to predetermined models of the lubricant pressure that are dependent upon vehicle speed, travel time, etc. In still another embodiment, the sensor 25 can detect a remaining life of the lubricant 23.

In some embodiments, the transmission system 22 can have a plurality of operating modes, including a manual shifting mode and an automatic shifting mode. In the manual shifting mode, the driver can manually select which gear 24a-24d in which to drive. In the automatic shifting mode, the transmission system 22 can automatically shift between the gears 24a-24d according to a predetermined shift schedule 26. In some embodiments, the shift schedule 26 is a computerized model of a known type that determines which gear 24a-24d should be engaged, based on various factors, including vehicle speed, power increase request, and the like. In other words, the shift schedule 26 can determine a "target gear" which is necessary for operating the engine system 14 within a desired range (e.g., a desired rpm range), and the transmission system 22 can shift from the "current gear" to the "target gear" accordingly.

Furthermore, the vehicle 10 can include a braking system 28. The braking system 28 can include one or more brakes 30a-30d. The system 28 can include any number of brakes 30a-30d including a left front brake 30a for selectively braking a left front wheel 12, a right front brake 30b for selectively braking a right front wheel 12, a left rear brake 30c for selectively braking a left rear wheel 12, and a right rear brake 30d for selectively braking a right rear wheel 12. The brakes 30a-30d can each be of any suitable type for selectively braking and decelerating the respective wheel 12. For instance, the brakes 30a-30d can each be a drum brake or a disc brake. Also, the braking system 28 can include various components for actuating the brakes 30a-30d, such as a hydraulic system 31. The hydraulic system 31 can include a main cylinder, valves, braking fluid, and the like for transferring a hydraulic load to the brakes 30a-30d, which causes the brakes 30a-30d to actuate and apply the respective braking load to the respective wheel 12.

Moreover, in some embodiments, the braking system 28 can include one or more brake sensors 33 that detects various characteristics of the braking system 28. For instance, the brake sensor 33 can be operable for detecting a temperature of one or more of the brakes 30a-30d. Also, in some embodiments, the brake sensor 33 can be operable for detecting a hydraulic pressure within the hydraulic system 31. In some embodiments, the sensor 33 can measure these characteristics directly (e.g., with a thermometer, pressure sensor, etc.), or the sensor 33 can measure these characteristics indirectly (e.g., via a model of the pressure/temperature/etc. that is dependent on vehicle speed, travel time, etc.).

Additionally, the vehicle 10 can include a control system 32. The control system 32 can be a computer system with programmed logic, one or more computerized memory modules, a processor, and the like. Also, the control system 32 can be part of or incorporated within a known engine control unit (ECU). The control system 32 can be in communication with each of the engine system 14, the transmission system 22, the acceleration sensor 17, and the braking system 28. Also, the control system 32 can control each of the engine system 14, the transmission system 22, and the braking system 28 as will be discussed in greater detail. Although a centralized control system 32 is illustrated in the embodiments of FIG. 1, it will be appreciated that the vehicle 10 could include various individual control systems 32 for each of the transmission system 22, the braking system 28, and the control system 32.

Figure 2:
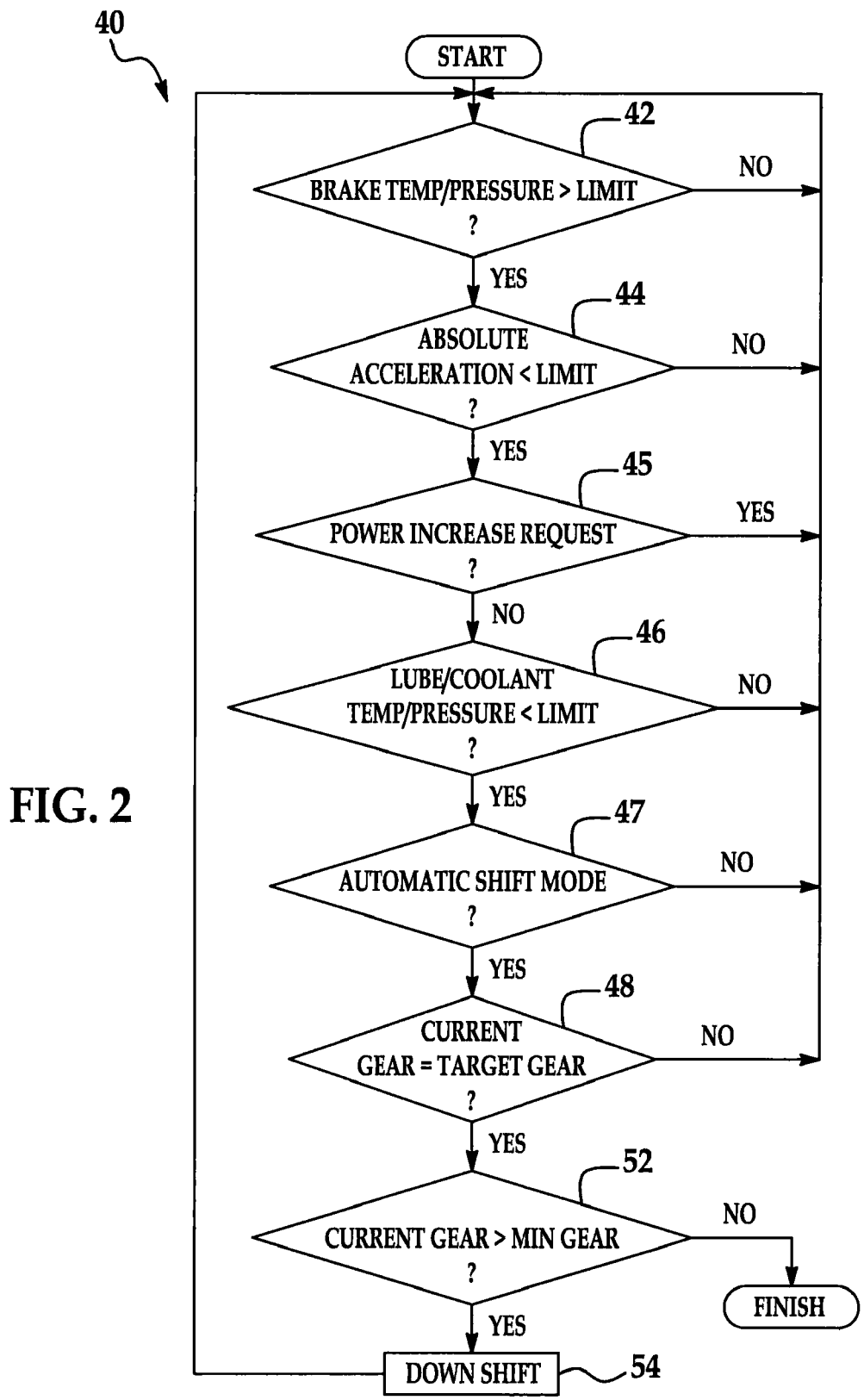
FIG. 2 is a flowchart illustrating a method of controlling the vehicle of FIG. 1 according to various exemplary embodiments.

Referring now to FIG. 2, an exemplary embodiment of a method 40 of operating the vehicle 10 will be described in greater detail. Generally, the method includes monitoring the condition of the brakes 30a-30d (e.g., brake temperature, brake pressure, brake torque, etc.). If these braking conditions satisfy certain predetermined criteria, then the transmission system 22 can automatically downshift from a higher gear 24d-24b to a lower gear 24c-24a. Engine braking occurs as a result to decelerate the vehicle 10, and the brake temperature and/or brake load can be reduced.

Accordingly, in some situations, the vehicle 10 may be travelling down a long, steep grade, and the driver may be riding the brakes to substantially maintain a desired speed. As such, an excessive braking temperature, brake pressure, brake torque, etc. can be detected by the sensor 33. As a result, the transmission system 22 can automatically downshift to increase engine braking, which can assist the brakes 30a-30d in decelerating the vehicle 10. Additionally, the braking temperature, pressure, and/or torque can be continuously monitored by the sensor 33, corresponding data can be fed back to the control system 32, and the transmission system 22 can continue to automatically downshift until the braking condition has improved or until the transmission system 22 is operating in the lowest allowable gear 24a-24c.

As will be discussed, this automatic downshifting can be dependent not only on the braking conditions but also on one or more secondary conditions of the engine system 14 and/or the transmission system 22. For instance, in some embodiments, the control system 32 will downshift the transmission system 22 only if both the braking condition and the secondary condition are satisfied. As such, the automatic downshifting is unlikely to overly interfere with the driver's intent, the downshifting is unlikely to degrade the vehicle 10 performance, etc. as will be discussed in greater detail below.

As shown in FIG. 2, the method 40 of operation can begin in decision block 42, wherein the braking sensor 33 determines whether the brake temperature and/or brake load (e.g., brake hydraulic pressure, brake torque, etc.) exceeds a predetermined limit. As discussed above, the braking sensor 33 can detect this braking condition directly using thermometers, pressure sensors, etc., or the braking sensor 33 can detect this condition according to predetermined models.

The limit of decision block 42 can be of any suitable value. For instance, in some embodiments, the brake temperature limit can be approximately five hundred degrees Celsius (500° C.). The brake load limit can also be of any suitable value. In some embodiments, these limits can be set to values above which the brakes 30a-30d could begin to malfunction. Also, these limits can be calculated with an added margin of safety.

If the braking temperature/load is below the predetermined limit (i.e., block 42 answered negatively), the method 40 loops back until the braking temperature and/or braking load is above the limit (i.e., block 42 answered affirmatively). Then, in decision block 44, it is determined whether the vehicle absolute vehicle acceleration is below a predetermined limit. For instance, the acceleration sensor 17 can determine whether the vehicle 10 is accelerating or decelerating beyond the predetermined limit. The limit of decision block 44 can be of any suitable value, such as 2 m/s$^2$. If the absolute acceleration is above the limit (i.e., decision block 44 answered negatively), then the method 40 loops back to the beginning. However, if the acceleration is below the limit (i.e., decision block 44 answered affirmatively), then the method 40 continues to decision block 45.

In decision block 45, it is determined whether the user has requested a power increase using the power request device 16 of the engine system 14. For instance, if the power request device 16 is a throttle pedal or throttle, the position of the throttle or throttle pedal can be determined in block 45. If the user is depressing the throttle pedal to request more power (block 45 answered affirmatively), then the method 40 loops back to the beginning. However, if the user has not requested more power (block 45 answered negatively), then the method 40 continues to decision block 46.

In decision block 46, the sensors 19, 21, 25 determine whether the temperature and/or pressure of the lubricants 18, 23 are below respective predetermined limits and/or whether the temperature of the coolant 20 is below a predetermined limit. These limits can be set at any suitable value, for instance, a value above which the engine system 14 or transmission system 22 can malfunction. These limits can be calculated with a respective margin of safety as well.

If the temperature(s) and/or pressures are above the limit(s) (i.e., decision block 46 answered negatively), then the method 40 can loop back to the beginning. However, if the temperature(s) are below the limit(s) (i.e., decision block 46 answered affirmatively), then the method 40 can continue to decision block 47.

In decision block 47, it is determined whether the transmission system 22 is in the automatic shift mode. If the transmission system 22 is in the manual shifting mode (i.e., decision block 47 answered negatively), then the method 40 can loop back to the beginning. However, if the transmission system 22 is in the automatic shifting mode (i.e., decision block 47 answered affirmatively), then the method 40 can continue in decision block 48.

In decision block 48, it is determined whether the "current gear" 24a-24d that is engaged within the transmission system 22 is the "target gear" 24a-24d according to the normal shift schedule 26 (FIG. 1). In other words, if the transmission system 22 is currently shifting between the gears 24a-24d according to the normal shift schedule 26 (i.e., decision block 48 answered negatively), then the method 40 can loop back to the beginning. However, if the transmission system 22 is currently stable (i.e., not shifting between the gears 24a-24d), then the method 40 can continue in decision block 52.

In decision block 52, it is determined whether the current gear 24a-24d is greater than a predetermined minimum gear 24a-24d. This predetermined minimum gear 24a-24d can be any of the gears 24a-24d. For instance, the predetermined minimum gear 24a-24d can be the lowest gear available (i.e., the first gear 24a); however, in other embodiments, the predetermined minimum gear 24a-24d can be the second gear 24b or higher.

If the current gear 24a-24d is at or below the predetermined minimum gear 24a-24d (i.e., decision block answered negatively), then the method 40 can end. However, if the current gear 24a-24d is greater than the predetermined minimum gear 24a-24d, then the method 40 can continue in block 54.

In block 54, the control system 32 can override the normal shift schedule 26 and cause the transmission system 22 to automatically downshift to a lower gear 24a-24c than the current gear 24b-24d. In some embodiments, the transmission system 22 downshifts to the next lowest gear 24a-24d; however, in other embodiments, the transmission system 22 skips one or more successively lower gears 24a-24d.

After the downshift of block 54, the method 40 loops back to the beginning. As such, the transmission system 22 can repeatedly downshift gears 24a-24d until the braking condition (detected in block 42) changes or one of the secondary conditions (detected in blocks 44-52) changes. More specifically, the transmission system 22 can repeatedly downshift until the brake temperature/load detected in block 42 is lower than the predetermined limit. Likewise, the transmission system 22 can repeatedly downshift until the vehicle 10 acceleration is above the predetermined limit, until the driver requests more power from the engine system 14, until the lubricants 18, 23 and/or coolant 20 is above the respective temperature/pressure limit, until the transmission 22 is placed in manual shifting mode, until the normal shift schedule 26 requests a gear shift, or until the predetermined minimum gear 24a-24d is reached.

It will be appreciated that the method 40 can cause automatic downshifting when the brake temperature and/or brake load is excessive. However, because the method 40 checks for various secondary conditions in block 44 through block 52, the downshifting is unlikely to occur at undesirable times.

For instance, downshifting is unlikely if the driver wants to accelerate the vehicle 10 because of the determinations in blocks 44 and 45. Thus, the driver can accelerate the vehicle 10 without the transmission system 22 undesirably downshifting.

Also, downshifting is unlikely if the lubricants 18, 23 and/or coolant 20 have excessive temperature/pressure because of the determination in block 46. Thus, this determination can avoid damage to the engine system 14 that would otherwise occur due to the automatic downshifting in block 54.

Moreover, the method 40 is unlikely to interfere with the driver's wishes to take over manual control of the transmission system 22 because of the determination in block 47. Likewise, the method 40 is unlikely to interfere with the automatic shifting determined by the shift schedule 26 because of the determination in block 48. Still further, the method 40 is unlikely to cause the rotational speed of the engine system 14 to increase undesirably because the downshifting can be limited to a predetermined gear because of the determination in block 52.

Accordingly, the method 40 presents an effective means of downshifting the transmission system 22 for engine braking under certain conditions. As such, the method 40 can ensure that the braking system 28, the engine system 14, and the transmission system 22 operate appropriately for various driving conditions.

It will be appreciated that the method 40 can be modified in various ways. For instance, the order of the decision blocks 42-52 can be varied without departing from the scope of the present disclosure. Moreover, one or more decision blocks 42-52 can be deleted without departing from the scope of the present disclosure. Still further, other secondary conditions of the transmission system 22 and/or the engine system 14 (other than the secondary conditions of blocks 44-52) can be factored into the method 40 without departing from the scope of the present disclosure.

Still further, the control system 32 can include a timer 34 (FIG. 1). The timer 34 can be relied upon in any one of the decision blocks 42-52. For instance, in some embodiments, the decision block 42 is answered affirmatively only if the brake temperature/load exceeds the predetermined limit for a predetermined amount of time (e.g., approximately 1-2 seconds) as measured by the timer 34. The other determinations of blocks 44-52 can be determined in a similar manner.

Figure 3:
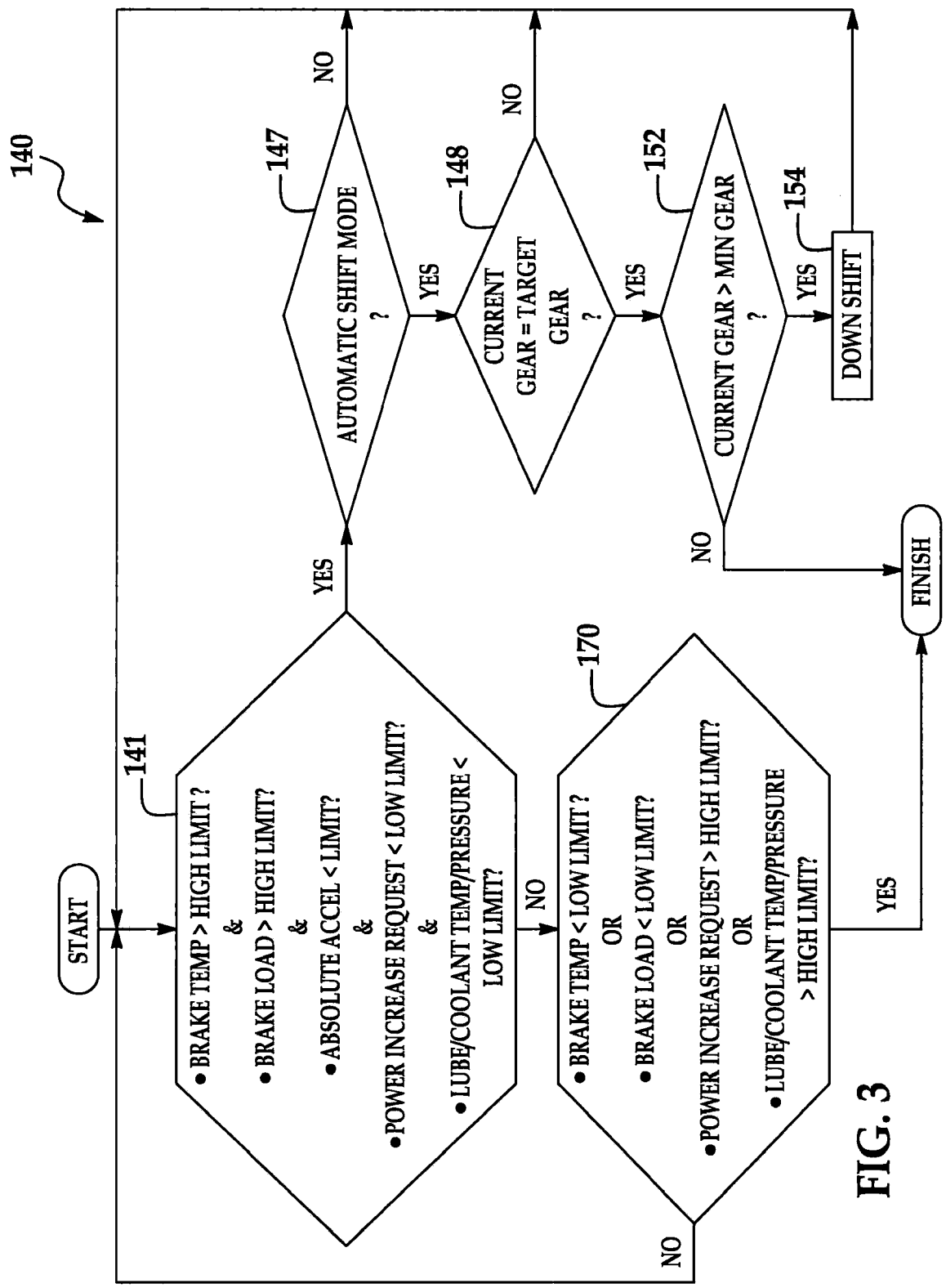
FIG. 3 is a flowchart further illustrating a method of controlling the vehicle of FIG. 1 according to various exemplary embodiments.

Referring now to FIG. 3, the method 140 of controlling the vehicle 10 is illustrated according to various additional exemplary embodiments. As shown, the method can begin in decision block 141, wherein it is determined whether the brake temperature is above a predetermined upper limit (e.g., approximately 500° C.), whether the brake load is above a predetermined upper limit, whether the acceleration of the vehicle 10 is below a predetermined limit, whether there is a power increase request that is below a predetermined lower limit (e.g., no power increase request), and whether the lubricant/coolant temperature is below a predetermined lower limit. These determinations can occur in a manner substantially similar to decision blocks 42, 44, 45, and 46 of FIG. 2.

If each of these conditions are met (i.e., decision block 141 answered affirmatively), then the method 140 can continue into decision block 147, which is substantially similar to decision block 47 of FIG. 2. If the transmission system 22 is in the manual shift mode (i.e., decision block 147 answered negatively), then the method 140 can loop back to the beginning.

However, if the transmission system 22 is in the automatic shift mode (i.e., decision block 147 answered affirmatively), then the method 140 can continue in decision block 148, which is substantially similar to decision block 48 of FIG. 2. If the target gear 24a-24d is different from the current gear 24a-24d according to the normal shift schedule 26 (i.e., decision block 148 answered negatively), then the method 140 can loop back to the beginning.

However, if the target gear 24a-24d is the same as the current gear 24a-24d according to the normal shifting schedule 26 (i.e., decision block 148 answered affirmatively), then the method 140 can continue in decision block 152, which is substantially similar to decision block 52 of FIG. 2. If the current gear 24a-24d is at or below the predetermined minimum gear 24a-24d (i.e., decision block 152 answered negatively), the method 140 can finish. However, if the current gear 24a-24d is above the predetermined minimum gear 24a-24d (i.e., decision block 152 answered affirmatively), then the transmission system 22 can downshift in block 154, which is substantially similar to block 54 in FIG. 2.

Then, the method 140 can loop back to the beginning for further downshifting. As described above, the method 140 can continue to downshift until one or more of the conditions determined in blocks 141, 147, 148, 152 is not satisfied.

If one or more of the conditions determined in decision block 141 is not satisfied (i.e., decision block 141 answered negatively), then the method 140 can continue to decision block 170 in which various third conditions are determined. For instance, in decision block 170, it is determined whether the brake temperature is less than a lower limit or whether the brake load is less than a lower limit. These lower limits can be of any suitable values. For instance, the brake temperature lower limit can be approximately 250° C. These lower limits can correspond to higher-than-normal brake temperatures/loads; however, they can be lower than the upper limits of decision block 141.

Also, in some embodiments, the third conditions of decision block 170 can be satisfied if a power request from the driver is above a predetermined upper limit. For instance, if the driver depresses the accelerator pedal for a predetermined amount of time or beyond a predetermined position, then the decision block 170 can be answered affirmatively.

Likewise, the third conditions of decision block 170 can be satisfied if any of the lubricants 18, 23 and/or coolant 20 has a temperature/pressure above a predetermined upper limit. These limits can be of any suitable value and can be greater than the lower limits of decision block 141.

If any one of the third conditions of decision block 170 are satisfied (i.e., decision block 170 answered affirmatively), it can be assumed that the driver wants to accelerate the vehicle and/or that the driver is no longer riding the brakes 30a-30d. Thus, the method 140 can end, and the method 140 will not override the normal shift schedule 26. However, if any of the third conditions of decision block 170 are not satisfied (i.e., decision block 170 answered negatively), then the method 140 can loop back to the beginning, and the possibility remains for automatic downshifting and engine braking.

Accordingly, the vehicle 10 and the methods of operation 40, 140 of the present disclosure can assist in braking the vehicle 10, but there are safeguards built into the methods 40, 140 to ensure that automatic downshifting will not interfere with the driver's intent and/or degrade the performance of the vehicle 10. For instance, the automatic downshifting is unlikely to occur if it would be contrary to the driver's intent for increased acceleration, manual shifting, etc. Likewise, the downshifting is unlikely to occur if it would interfere with the normal shifting schedule 26 of the transmission system 22. Also, downshifting is unlikely if it would ramp up the speed of the engine system 14 excessively, or if such downshifting would damage the engine system 14.

The above description is merely exemplary in nature and, thus, variations of the above description are intended to be within the scope of the present disclosure. Such variations are not to be regarded as a departure from the spirit and scope of the present disclosure.

What is claimed is:

1. A method of controlling a vehicle having a transmission system, an engine system, a control system, and a braking system, the method comprising:
monitoring with the control system a temperature of at least one brake of the braking system sensed by a first sensor;
detecting a second condition of at least one of the transmission system and the engine system with at least a second sensor;
determining with the control system whether the second condition detected by the second sensor satisfies a predetermined criteria; and
detecting an absolute vehicle acceleration with a third sensor;

downshifting the transmission with the control system from a current gear to a lower gear to thereby cause engine braking only when the control system determines that the brake temperature monitored by the control system exceeds a predetermined temperature, the second condition satisfies the predetermined criteria, and the absolute vehicle acceleration is below a predetermined acceleration limit.

2. The method of claim 1, wherein the second condition satisfies the predetermined criteria when at least one of a coolant temperature is below a predetermined coolant temperature limit, an engine lubricant temperature is below a predetermined engine lubricant temperature limit, an engine lubricant pressure is below a predetermined engine lubricant pressure limit, and a transmission lubricant pressure is below a predetermined transmission lubricant pressure limit.

3. The method of claim 1, wherein the second condition satisfies the predetermined criteria when a power increase request to the engine system is below a predetermined limit.

4. The method of claim 1, wherein the second condition satisfies the predetermined criteria when at least one of a current gear matches a target gear according to a normal shift schedule, the transmission system is in an automatic mode, and the current gear is greater than a predetermined minimum gear.

5. The method of claim 4, wherein the predetermined minimum gear is greater than a lowest available gear.

6. The method of claim 1, further comprising determining with the control system whether the downshifting causes at least one of the second condition and the braking condition to be unsatisfied, and repeating the downshifting.

7. The method of claim 1, wherein downshifting includes downshifting from the current gear to the next lowest gear.

8. The method of claim 1, wherein the second condition satisfies the predetermined criteria when each of a coolant temperature is below a predetermined coolant temperature limit, an engine lubricant temperature is below a predetermined engine lubricant temperature, a power increase request to the engine system is below a predetermined limit, a current gear matches a target gear according to a normal shift schedule, the transmission system is in an automatic mode, and the current gear is greater than a predetermined minimum gear.

9. The method of claim 1, further comprising cancelling with the control system an override of a normal shifting schedule when a third condition satisfies a predetermined third criteria, the third condition satisfying the predetermined third criteria when at least one of the brake temperature is below a predetermined lower brake temperature limit, a braking load is below a predetermined lower braking load limit, a power increase request to the engine system is above a predetermined upper limit, a coolant temperature is above a predetermined upper coolant temperature limit, and an engine lubricant temperature is above a predetermined upper lubricant temperature limit.

10. A vehicle with a wheel comprising:
an engine system that outputs power;
a transmission system that transfers power from the engine system to be delivered to the wheel, the transmission system including a plurality of gears;
a braking system that selectively decelerates the wheel, the braking system operable to detect whether a brake temperature is above a predetermined brake temperature limit;
at least one control system that causes selective downshifting among the plurality of gears to thereby cause engine braking when the brake temperature is above a predetermined limit, only when an absolute vehicle acceleration is below a predetermined acceleration limit, and also when a second condition is satisfied, the second condition being a condition of at least one of the engine system and the transmission system.

11. The vehicle of claim 10, wherein the second condition is satisfied when at least one of a coolant temperature of the engine system is below a predetermined coolant temperature limit, an engine lubricant temperature of the engine system is below a predetermined engine lubricant temperature limit, an engine lubricant pressure is below a predetermined engine lubricant pressure limit, and a transmission lubricant pressure is below a predetermined transmission lubricant pressure limit.

12. The vehicle of claim 10, wherein the second condition is satisfied when a power increase request to the engine system is below a predetermined limit.

13. The vehicle of claim 10, wherein the second condition is satisfied when at least one of the current gear matches a target gear according to a normal shift schedule, the transmission system is in an automatic mode, and the current gear is greater than a predetermined minimum gear.

14. The vehicle of claim 13, wherein the predetermined minimum gear is greater than a lowest available gear.

15. The vehicle of claim 10, wherein the control system causes repeated downshifting among the plurality of gears.

16. The vehicle of claim 10, wherein the control system selectively downshifts from a current one of the plurality of gears to a next lowest of the plurality of gears.

17. The vehicle of claim 10, wherein the second condition is satisfied when each of a coolant temperature is below a predetermined coolant temperature limit, an engine lubricant temperature is below a predetermined engine lubricant temperature, a power increase request to the engine system below a predetermined limit, a current gear matches a target gear according to a normal shift schedule, the transmission system is in an automatic mode, and the current gear is greater than a predetermined minimum gear.

18. The vehicle of claim 10, further comprising a timer that times a time that the brake temperature is above the predetermined limit and the second condition is satisfied, and wherein the at least one control system selectively downshifts if the time exceeds a predetermined time.

* * * * *